United States Patent [19]

Farmer et al.

[11] Patent Number: 5,364,904
[45] Date of Patent: Nov. 15, 1994

[54] EMULSION POLYMERIZATION

[75] Inventors: David B. Farmer, Dorking; Alistair J. McLennan, Carshalton, both of United Kingdom

[73] Assignee: Unilever Patent Holdings B.V., Rotterdam, Netherlands

[21] Appl. No.: 835,438

[22] PCT Filed: Jun. 14, 1991

[86] PCT No.: PCT/GB91/00964

§ 371 Date: Apr. 29, 1992

§ 102(e) Date: Apr. 29, 1992

[87] PCT Pub. No.: WO92/00335

PCT Pub. Date: Jan. 9, 1992

[30] Foreign Application Priority Data

Jun. 29, 1990 [GB] United Kingdom ............ 90307147.0

[51] Int. Cl.$^5$ ............................................. C08L 31/00
[52] U.S. Cl. ................................... 524/832; 524/494; 524/803

[58] Field of Search .................. 524/494, 803, 832

[56] References Cited

U.S. PATENT DOCUMENTS

| | | | |
|---|---|---|---|
| 4,801,643 | 1/1989 | Craig | 524/832 |
| 4,870,126 | 9/1989 | Kinson et al. | 524/494 |
| 4,943,612 | 7/1990 | Morita et al. | 524/714 |
| 4,960,814 | 10/1990 | Wu et al. | 524/312 |

FOREIGN PATENT DOCUMENTS 0273605 7/1988 European Pat. Off. .
6510472 2/1966 Netherlands .

*Primary Examiner*—Edward Cain
*Attorney, Agent, or Firm*—Cushman, Darby & Cushman

[57] ABSTRACT

A copolymer emulsion suitable for use as a sizing agent for glass fibre is formed by microfluidising an emulsion containing at least 90% by weight of C1 to C10 alkyl(-meth)acrylate monomer and stabilised by a protective colloid, e.g. polyvinyl alcohol, prior to initiation by the polymerisation reaction.

8 Claims, No Drawings

EMULSION POLYMERIZATION

FIELD OF THE INVENTION

This invention relates to copolymer emulsions, and particularly concerns copolymer emulsions suitable for use as sizing agents for glass fibre prior to incorporation of bulk glass fibre in thermoplastic polymers.

BACKGROUND OF THE INVENTION

Glass fibre is a form of glass produced by a technique in which molten glass is passed through a multi apertured mould to form filaments. These filaments have: small diameters usually in the range of 1 micron to 4 micron, typically about 2 micron, although diameters outside this range are known for special applications. These filaments are then subjected to a sizing operation, using a sizing agent, possibly in combination with other additives, to provide bonding of the filaments together to form strands or fibres.

One application of glass fibres is to provide reinforcement and flexibility to thermoplastic polymer articles, typically made of polymers such as polypropylene, polyamides and polycarbonates, and usually shaped by injection moulding.

The sizing agent additionally functions to protect the filaments from breaking during handling, and must also be To obtain the most efficient sizing of glass filaments, the emulsion should be free of particles above 2 microns, and preferably has a weight mean particle diameter of above about 0.2. micron, more preferably above about 0.4 micron. Mean weight particle diameters of the copolymer particles are typically in the range of 0.4 to 1.0 micron.

Examples of the acrylate monomers are methyl methacrylate (homopolymer Tg of 100 ° C.), ethylhexyl acrylate (Tg of −60 ° C.), butyl acrylate (Tg of −50° C.) and ethyl acrylate (Tg of −22° C.). A proportion of a carboxylic monomer, for example acrylic acid, may also be present to improve adhesion to the surface of glass. Other monomers may be incorporated at minor levels, that is up to 10% by weight of the total monomers, usually up to 5%. Examples of these monomers are vinyl silanes, cross linking agents and epoxy monomers, e.g. glycidylmethacrylate. The cross linking agents may be capable of internal cross linking, e.g. diallyl maleate, triallyl cyanurate or crosslinkable, e.g. N-methylolacrylamide.

The acrylate monomer is generally initially present in the form of an emulsion which requires to be stabilised by a protective colloid, and the preferred colloid material is polyvinyl alcohol. There is no criticality in the degree of hydrolysis of polyvinyl alcohol; preferably the degree of hydrolysis is above 70%, and the degree of polymerisation is preferably above 550.

Other protective colloids which can be used include hydroxyethyl cellulose, carboxymethyl cellulose, ethoxylated starch derivatives, polyacrylates, acrylamides, gelatins, alginates, gums and agar. capable of withstanding the heat applied, e.g. up to 200° C., during contact with the polymeric material to be reinforced.

SUMMARY OF THE INVENTION

In one aspect the present invention provides a copolymer emulsion containing from 20% to 70%, preferably 45 to 60%, by weight solids which comprise copolymer particles having a weight mean particle diameter from about 0.05 micron to about 1.5 micron, stabilised by a protective colloid, e.g. polyvinylalcohol, comprising at least about 90% by weight of C1 to C10 alkyl(meth)acrylate monomer to provide a polymer-glass transition temperature (Tg) in the range from about 0° C. to about 60° C., preferably from about 20° C. to about to 50° C. The use of the particle sizes quoted allows the preparation of a stable emulsion which is of particular use as a sizing agent suitable for glass fibre; use of larger particles may have a detrimental effect on strand integrity.

The invention thus enables production of acrylate copolymer emulsions suitable for use as a glass fibre sizing agent, which has not hitherto been possible. Acrylates have better properties of heat resistance than materials conventionally used as sizing agents, e.g. vinyl acetate emulsion polymers, and so are better suited to this application.

The Tg quoted is the effective Tg and this could be provided either by suitable choice of monomers, or by addition of a plasticiser, e.g. dibutyl phthalate, to a mixture that would otherwise produce a polymer having a Tg above the specified range.

The protective colloid will usually be present in an amount from about 1% to about 5% by weight of monomer present.

A surfactant may be present to assist in stabilising monomer droplets, and preferably an oil compatible solvent, for example a long chain alkane, e.g. hexadecane, is present in the droplets to stabilise the monomers.

Polymerisation can be achieved using any suitable initiation system: the system used is not critical, but it is preferred that the system is oil soluble.

The desired particle size can be achieved by subjecting an emulsion including monomers and protective colloid, e.g. polyvinyl alcohol, to a microfluidisation step, for example with the aid of sonication or an impinging jet device, prior to initiation. In a sonication device, high intensity sound waves are introduced into the emulsified monomer feedstock. In an impinging jet device a pump, for example an electric pump or an air driven piston, produces a high static liquid pressure, e.g. up to 1400 bar, with the aid of air at pressure of 6 bar. The pump forces the emulsified monomers through a ceramic interaction chamber at high velocity. In this chamber the flow is divided into two streams which are forced through narrow slits to impinge together. At the point of impingement a volume of intense turbulence is created causing a release of energy as cavitation and shear forces. Jet impingement devices of this type can be obtained from Microfluidics Corporation of Newton Mass. U.S.A.

The conventional features in the preparation the copolymer emulsions of the invention are well characterised in the literature. Polymer Synthesis (vols I and II) by Sandlet & Karo (Academic Press 1974) and Preparative Methods of Polymer Chemistry (2nd Ed) by Sorenson & Campbell (Interscience 1968 ) provide preparative information. Methoden der Organischen Chemie (Houben-Weyl) Band XIV published by Georg Thieme Verlag Stuttgart (1961) also provides preparative descriptions. However these general disclosures do not provide information on the formation of the small particle size emulsions to which the present invention is directed.

The invention also provides a method of preparing a copolymer emulsion in accordance with the invention, wherein monomer feedstock is prepared in emulsion form stabilised by a protective colloid, characterised in that prior to initiation the emulsion is subjected to a microfluidisation step to reduce the emulsion average particle size to be in the range 0.05 micron to 1.5 micron.

The invention also includes within its scope the use of a copolymer emulsion in accordance with the invention as a size for glass fibre, wherein an effective amount of the emulsion is applied to the glass fibre prior to the latter being incorporated into a thermoplastic article.

Also within the scope of the invention are glass fibre and thermoplastic materials and articles produced in this way.

TEST METHODS

Particle size distribution: the weight mean particle diameter D(v0.5) was measured using a Malvern Mastersizer, which employs a laser light scattering technique using very dilute emulsion samples.

Viscosity: a Brookfield viscometer type RVT was used with a spindle No.1 and speed (rpm) of 20. Measurements were made at 25° C.

Weight loss: films were cast and dried for 3 days at ambient temperature. They were then weighed and heated to 200° C. for 10 minutes and 30 minutes with the weight loss being measured after each period.

SPECIFIC DESCRIPTION OF THE INVENTION

Examples of the process of the invention will now be given to illustrate but not limit the invention.

EXAMPLES 1-6

Oil phase A and aqueous phase B having the compositions given below were prepared separately and then mixed with each other and pre-emulsified using a Greaves mixer (model B) obtained from Joshua Greaves & Sons of Ramsbottom England on full power (9,500 rpm) for 1 minute.

| Phase A | |
|---|---|
| methy methacrylate | 190 g |
| ethyl hexyl acrylate | 60 g |
| Interox BCHPC 75W* | 0.5 g |
| dilauroyl peroxide | 0.17 g |
| hexadecane | 3.0 g |

*This is bis (4-t-butylcyclohexyl)peroxydicarbonate.

These initiators (Interox and dilauroyl peroxide) are oil soluble.

| Phase B | |
|---|---|
| polyvinyl alcohol GL05** | 4.5 g |
| polyvinyl alcohol KL05** | 4.5 g |
| water | 252.45 g |
| surfactant (A,B,C,D or E - see below)*** | |
| antifoam | 2 drops |

**The polyvinyl alcohols were obtained from Nippon Gohsei KK of Japan. GL05 is 88% hydrolysed and KL05 80% hydrolysed. Each has a degree of polymerisation of 600.
***Surfactant was present in an amount 0.5% active on monomer weight.

The pre-emulsion obtained by mixing phases A and B was then processed through a jet impingement microfluidiser (type M110T obtained from Microfluidics Corp.) using one pass at 5 bar air pressure. The gauge registered a hydraulic pressure 893 to 939 bar as the pump operated. This resulted in production of a microfluidised emulsion.

For examples 1-3, 20% of the microfluidised emulsion was polymerised at 70° C. for 1 hour, then the remaining microfluidised emulsion was added continuously over 3 hours, maintaining the polymerisation temperature at 70° C. and holding the temperature for 15 minutes after additions were complete.

For examples 4-6, 40% of the microfluidised emulsion was polymerised at 70° C. for 0.5 hours, then the remaining microfluidised emulsion was added continuously over 1.5 hours, maintaining the polymerisation temperature at 70° C. and holding the temperature for a further 30 minutes after additions were complete.

Different surfactants A-E were used in the different examples.

After the holding period in each experiment, the temperature was reduced to 50° C. and a solution of sodium metabisulphite (0.25 g in 5 g water) was added, followed by a solution of t-butylhydroperoxide (0.25 g in 5 g water). All batches were made at 50% theoretical non-volatiles (nv) and had a theoretical Tg of 40° C.

TABLE I

| Example | Surfactant | nv (%) | pH | Viscosity | Monomer Size (u) |
|---|---|---|---|---|---|
| 1 | A | 49.02 | 4.02 | 4.94 | 0.38 |
| 2 | B | 49.00 | 3.98 | 1.03 # | 0.43 |
| 3 | C | 49.05 | 5.86 | 2.48 | 0.49 |
| 4 | C | 48.90 | 6.01 | 3.52 | 0.43 |
| 5 | D | 48.90 | 4.90 | 3.05 | 0.74 |
| 6 | E | 49.29 | 4.31 | 1.26 | 0.46 | measured at 50 rpm.
Surfactants A to E were:
A Empicol LXV: Sodiumlauryl sulphate obtained from Albright & Wilson of England.
B Synperonic NP30: Nonylphenylethoxylate, 30 EO obtained from ICI Ltd of England
C Aerosol A22n: Tetrasodium N-(1,2-dicarboxyethyl)-N-octadecyl-sulphonsuccinamate obtained from Cyanamid Corp USA
D Aerosol A268: Disodium isodecylsulphosuccinate
E Soprofor 40: Tristyrylphenylethoxylate 20 EO obtained from Rhone Poulenc of France Weight mean particle diameters (in micron) of the monomer droplets are shown in Table I, and weight mean particle diameters (in micron) of the polymer emulsion latices are shown in Table II together with weight losses after heating at 200° C.

TABLE II

| | latex Particle | Weight loss at 200° C. | |
|---|---|---|---|
| Expt | size (u) | 10 min (%) | 30 min (%) |
| 1 | 0.43 | 2.37 | 2.97 |
| 2 | 0.57 | 1.41 | 2.08 |
| 3 | 0.54 | 1.29 | 1.95 |
| 4 | 0.46 | 1.35 | 2.18 |
| 5 | 0.46 | 1.63 | 2.55 |
| 6 | 0.53 | 1.40 | 2.24 |

The particle size of the latices are seen to be in the range which makes them suitable as glass fibre sizes. The small weight losses at 200° C. demonstrate the thermal stability of the products and hence suitability for use as sizing agents for glass fibre for incorporation in thermoplastic polymer articles.

EXAMPLE 7

The procedure of examples 1 to 3 was repeated generally described above, with the following modification. After the holding period the temperature was reduced to 50° C. and a solution of sodium metabisulphite (0.75 g in 15 g water) was added, followed by a solution of t-butylhydroperoxide (0.75 g in 15 g water).

In this example, phases A and B had the following compositions:

| Phase A | |
|---|---|
| methyl methacrylate | 506 g |
| ethyl hexyl acrylate | 244 g |
| Interox BCHPC 75W | 1.5 g |
| dilauroyl peroxide | 0.51 g |
| hexadecane | 9.0 g |
| Phase B | |
| polyvinyl alcohol GL05 | 13.5 g |
| polyvinyl alcohol KL05 | 13.5 g |
| water | 757.4 g |
| surfactant C (45% aq. soln.) | 8.4 g |
| antifoam | 6 drops |

The resulting product had a theoretical Tg of 22° C. and the following other properties:

| nv (%) | pH | Vicosity | Particle Size monomer (micron) | Particle Size latex (micron) |
|---|---|---|---|---|
| 50.10 | 6.32 | 1.73 | 0.59 | 0.46 |

The emulsions obtained from these experiments are thus suitable for use as sizing agents for glass fibres. In a typical method for producing glass fibre, glass filaments are drawn down from casting tank orifices and the filaments are contacted with the emulsion size via an application roller wheel or other contact means, resulting in bonding of the filaments together to form strands of fibres. The fibres are then wound on a collet to form a cake of glass fibres which is then dried. The emulsion size will usually have a solids content of 2% to 5% and may contain additives such as lubricants and coupling agents which are well known to the skilled user.

We claim:

1. A copolymer emulsion containing from 20% to 70% by weight solids which comprise copolymer particles having a weight mean particle diameter in the range about 0.2 micron to about 1.50 micron, stabilised by a protective colloid, in an amount from about 1% to about 5% by weight of monomer present, said copolymer particles comprising at least about 90% by weight of C1 to C10 alkyl(meth)acrylate monomers to provide a Tg in the range from about 0° C. to about 60° C. and said protective colloid being polyvinyl alcohol.

2. A copolymer emulsion according to claim 1, wherein the copolymer particles have a weight mean particle diameter in the range 0.4 micron to 1.0 micron.

3. A method of preparing a copolymer emulsion according to claim 1, wherein monomer feedstock is prepared in emulsion form stabilized by polyvinyl alcohol as a protective colloid, characterised in that prior to initiation of the copolymerization, the monomer emulsion is subjected to a microfluidisation step to reduce the emulsion average particle size to be in the range 0.2 micron to 1.5 micron and thereafter conducting the copolymerization to obtain a colloid stabilized copolymer emulsion.

4. A method according to claim 3, wherein the average particle size of the emulsion is in the range 0.4 microns to 1.0 micron.

5. A method according to claim 3, wherein the protective colloid is polyvinyl alcohol.

6. A method according to claim 3, wherein the microfluidisation is achieved by an impinging jet device.

7. In a method of sizing glass fibers, the improvement which comprises using, as the size, an effective amount of the emulsion of claim 1.

8. In a method of preparing a glass fiber reinforced thermoplastic article, the improvement which comprises sizing the glass fiber with an effective amount of a copolymer emulsion according to claim 1 before using the glass fiber to prepare said reinforced thermoplastic article.

* * * * *